(12) United States Patent
Lippincott et al.

(10) Patent No.: US 7,962,610 B2
(45) Date of Patent: Jun. 14, 2011

(54) STATISTICAL DATA INSPECTOR

(75) Inventors: Lisa Ellen Lippincott, Berkeley, CA (US); John Edward Firebaugh, Emeryville, CA (US); Dennis Sidney Goodrow, Emeryville, CA (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 12/044,790

(22) Filed: Mar. 7, 2008

(65) Prior Publication Data

US 2008/0228442 A1    Sep. 18, 2008

Related U.S. Application Data

(60) Provisional application No. 60/893,528, filed on Mar. 7, 2007.

(51) Int. Cl.
*G06F 15/173* (2006.01)
*G06F 7/00* (2006.01)
*G01R 13/00* (2006.01)
*G06Q 30/00* (2006.01)

(52) U.S. Cl. ....... 709/224; 702/74; 707/688; 705/14.52; 705/14.53

(58) Field of Classification Search ................. 709/224; 702/74; 707/1
See application file for complete search history.

(56) References Cited

U.S. PATENT DOCUMENTS

| | | |
|---|---|---|
| 6,289,394 B1 | 9/2001 | Kozuka |
| 6,407,988 B1 | 6/2002 | Agraharam et al. |
| 6,571,186 B1 * | 5/2003 | Ward .............................. 702/74 |
| 6,839,751 B1 * | 1/2005 | Dietz et al. ..................... 709/224 |
| 6,851,115 B1 | 2/2005 | Cheyer et al. |
| 6,971,094 B1 | 11/2005 | Ly |
| 7,275,048 B2 | 9/2007 | Bigus et al. |
| 7,277,919 B1 | 10/2007 | Donoho et al. |
| 7,523,190 B1 * | 4/2009 | Bickerstaff et al. ........... 709/224 |
| 2001/0013008 A1 * | 8/2001 | Waclawski ..................... 705/10 |
| 2002/0188691 A1 | 12/2002 | Ignatius et al. |
| 2003/0088542 A1 * | 5/2003 | McGee et al. ..................... 707/1 |
| 2003/0126256 A1 * | 7/2003 | Cruickshank et al. ........ 709/224 |
| 2004/0117275 A1 | 6/2004 | Billera |
| 2004/0215781 A1 | 10/2004 | Pulsipher et al. |
| 2004/0255048 A1 | 12/2004 | Lev Ran et al. |
| 2007/0204078 A1 | 8/2007 | Boccon-Gibod et al. |
| 2008/0201462 A1 | 8/2008 | Liss et al. |

* cited by examiner

*Primary Examiner* — Ian N Moore
*Assistant Examiner* — Kiet Tang
(74) *Attorney, Agent, or Firm* — Michael A. Glenn; Glenn Patent Group

(57) ABSTRACT

An embodiment of the invention provides a technique that allows the collection, storage, and manipulation of data collected in a computer network.

21 Claims, 3 Drawing Sheets

STATISTICAL DATA INSPECTOR

CROSS REFERENCE TO RELATED APPLICATIONS

This application claims priority to U.S. patent application Ser. No. 60/893,528, filed Mar. 7, 2007, which application is incorporated herein in its entirety by this reference thereto.

BACKGROUND OF THE INVENTION

1. Technical Field

The invention relates to management of a computer network. More particularly, the invention relates to the use of a statistical data inspector in connection with the management of a computer network.

2. Description of the Prior Art

Relevance based computing is disclosed, for example, in Donoho, D. et al, *Relevance clause for computed relevance messaging*, U.S. Pat. No. 7,277,919 (issued Oct. 2, 2007). In such system: "a collection of computers and associated communications infrastructure to offer a new communications process . . . allows information providers to broadcast information to a population of information consumers. The information may be targeted to those consumers who have a precisely formulated need for the information. This targeting may be based on information which is inaccessible to other communications protocols. The targeting also includes a time element. Information can be brought to the attention of the consumer precisely when it has become applicable, which may occur immediately upon receipt of the message, but may also occur long after the message arrives. The communications process may operate without intruding on consumers who do not exhibit the precisely-specified need for the information, and it may operate without compromising the security or privacy of the consumers who participate." (Abstract)

There are many measurements that can be made in an operational environment, such as an environment based upon relevance based messaging, as discussed above, to understand for example how systems are being used or to modify or manage such systems. Such characteristics can be things such as: When was the last time a user logged in? When was the last time a particular application ran? How often is it run? A number of measurements can thus be made in such environment and then captured to observe trends. Such trends allow an IT manager to plan and adjust usage, for example. In the case of applications, companies have legal obligations to pay for software or pay for services. They need to monitor how many people are using the software. Another area of interest is power management. Thus, there are many reasons why people want to measure the frequency of use of various things in a network.

One network architecture that embodies such relevance based messaging system is the BigFix Enterprise Suite™ ("BES"; BigFix, Inc., Emeryville, Calif.), which brings endpoints in such system under management by installing a native agent on each endpoint. Such agents are capable of collecting enormous amounts of data, but managing, storing, and processing such data is currently problematic.

It would be advantageous to provide a technique that allowed the collection, storage, and manipulation of data collected in a computer network.

SUMMARY OF THE INVENTION

An embodiment of the invention provides a technique that allows the collection, storage, and manipulation of data collected in a computer network.

DETAILED DESCRIPTION OF THE INVENTION

An embodiment of the invention exists in a relevance based messaging system that is used for management of entities within a computer network. Such system is provided with a technique that allows the collection, storage, and manipulation of data collected by the expedient of a method and apparatus that comprehends one or more statistical inspectors that allow formalization of the measurement of things that change over time, and that allow distribution of some of the work of maintaining statistics, such that it is possible to keep track of things that are important in a managed environment, and to report on these thing in a statistical fashion.

An embodiment provides the ability to collect such statistical information remotely, such that the infrastructure measures itself and collects statistics. As opposed to individual information about a particular instance or particular regiment at a particular moment in time, a statistical representation collapses the amount of information. If a system manager later on has an interest in looking at some operational characteristics in a managed environment that have been monitored, the infrastructure has been used to store these interesting characteristics, and the system manager only has to access them. An embodiment allows one to combine this information after the fact in ways that had not been thought of at the time. Thus, one might be interested in combining certain statistics from a certain class of machines, or to find out if IIS servers are configured with this a particular piece of software. Because various aspects of network entities are measured by the statistical data inspectors that are deployed in the environment, a system manager can send out a query, collect statistics, and look at trends over time by combining such statistics to develop a view of various operational characteristics.

One of the things that is lost when one combines statistics is some detail. The set of functionality described by statistical data inspectors pushes some of the functions out into the environment where the statistics are measured and kept, and then provides the ability to pull these statistics back and operate on them in an environment that allows one to combine the statistics, for example, to detect overall trends within an environment of computed relevance messaging.

Figure 1:
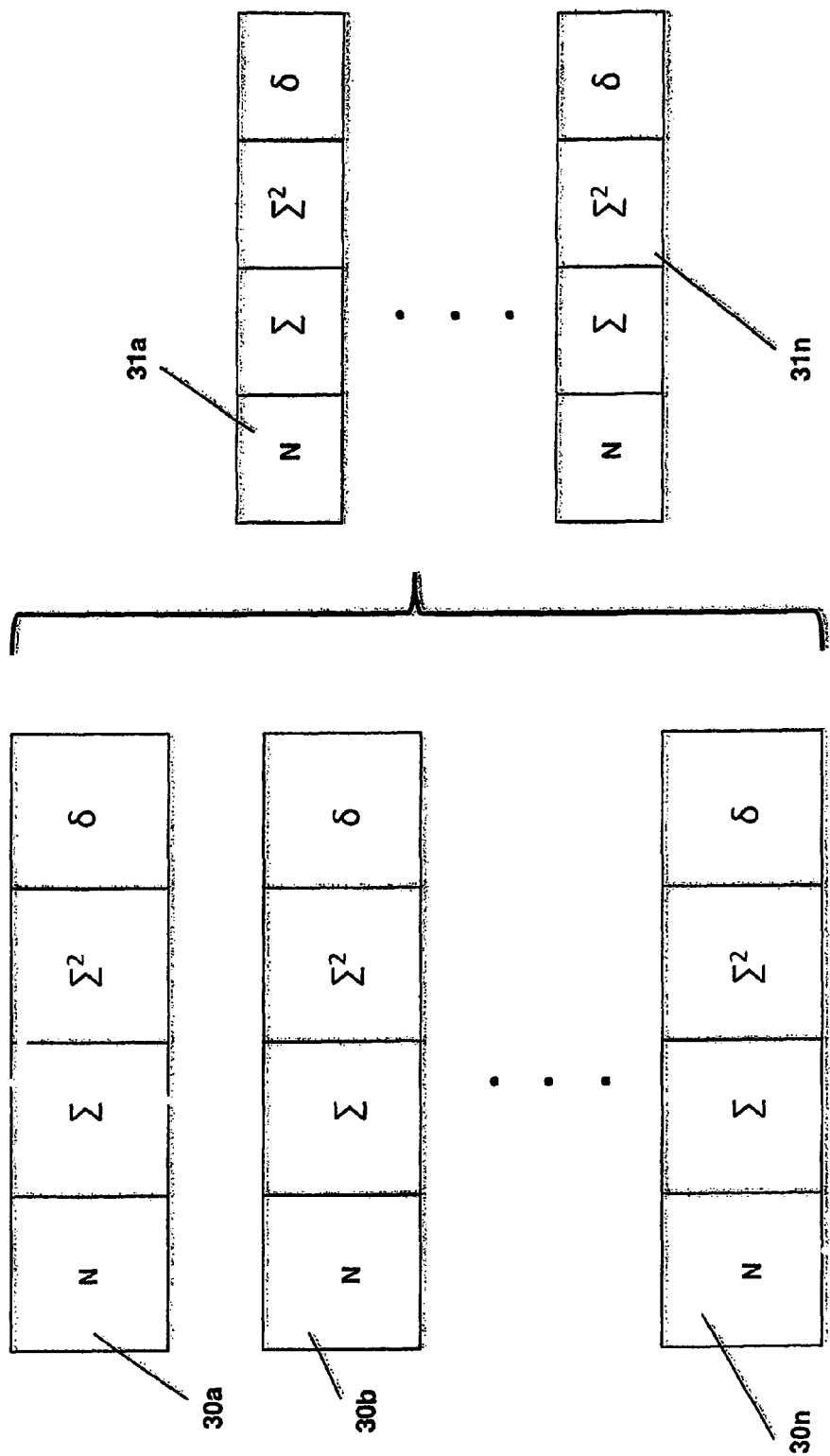
FIG. 1 is an architectural diagram of a statistical data inspector hierarchy according to the invention.

FIG. 1 is an architectural diagram of a statistical data inspector hierarchy according to the invention. An embodiment provides a binning structure where measurements are stored and time stamped with a certain range of time to which they are applied. There are impact bins that are assigned to those times. The system then accumulates all of these various statistical properties and combines time with the measurements in the bins. The bins may be archived locally by the inspectors in the sense that they are stored, even if no new measurements may be coming in. The fact that these agents can actually store this information independently of being connected to the network, and can deliver the measurements after the fact means that some of the bins can still receive and store new data that applies to previous time bins, e.g. for agents that may have been disconnected from the network when the data were first acquired for a particular bin, i.e. the agents in question were unable to communicate. Over time, one gets a good picture of what these measurements are, each again corresponding to a time interval.

In FIG. 1, a first series of time stamped bins 30a-30n collect data for five-minute intervals. Each bin is associated with an agent, i.e. the statistical data inspector, that is deployed to collect data in connection with a particular network element, such as a server, personal computer, router, etc. An aggregation bin 30a collects data for a five-minute interval, another bin 30b collects data for a next five-minute interval, and so on. Each such bin has a plurality of fields that are populated, for example, with raw data N, such as the number of times an application was accessed during the interval, etc.; as well, the bins may include results of statistical operations (discussed in greater detail below) which, in the example of FIG. 1, include summation, summation-squared, and standard deviation. Those skilled in the art will appreciate that bins may store more or less data and may perform more or less data manipulation. Further, such aggregation bins aggregate time based data at any one or more elements in a hierarchy of distributed network elements. Such hierarchy comprises an aggregational pipeline in which aggregation can occur at any of one or more points along the entire pipeline from agent samples values and sampling time, relays collecting and forwarding, servers collecting and forwarding, consoles collecting and displaying, and cross server consolidation. In this embodiment, the statistical inspector stores and forwards raw data aggregates raw data and stores said aggregated raw data and/or forwards said aggregated raw data. An aggregation algorithm is provided in one embodiment that combines measurements into bins, combines bins with like bins, and consolidates bins into a smaller number of bins.

Figure 3:
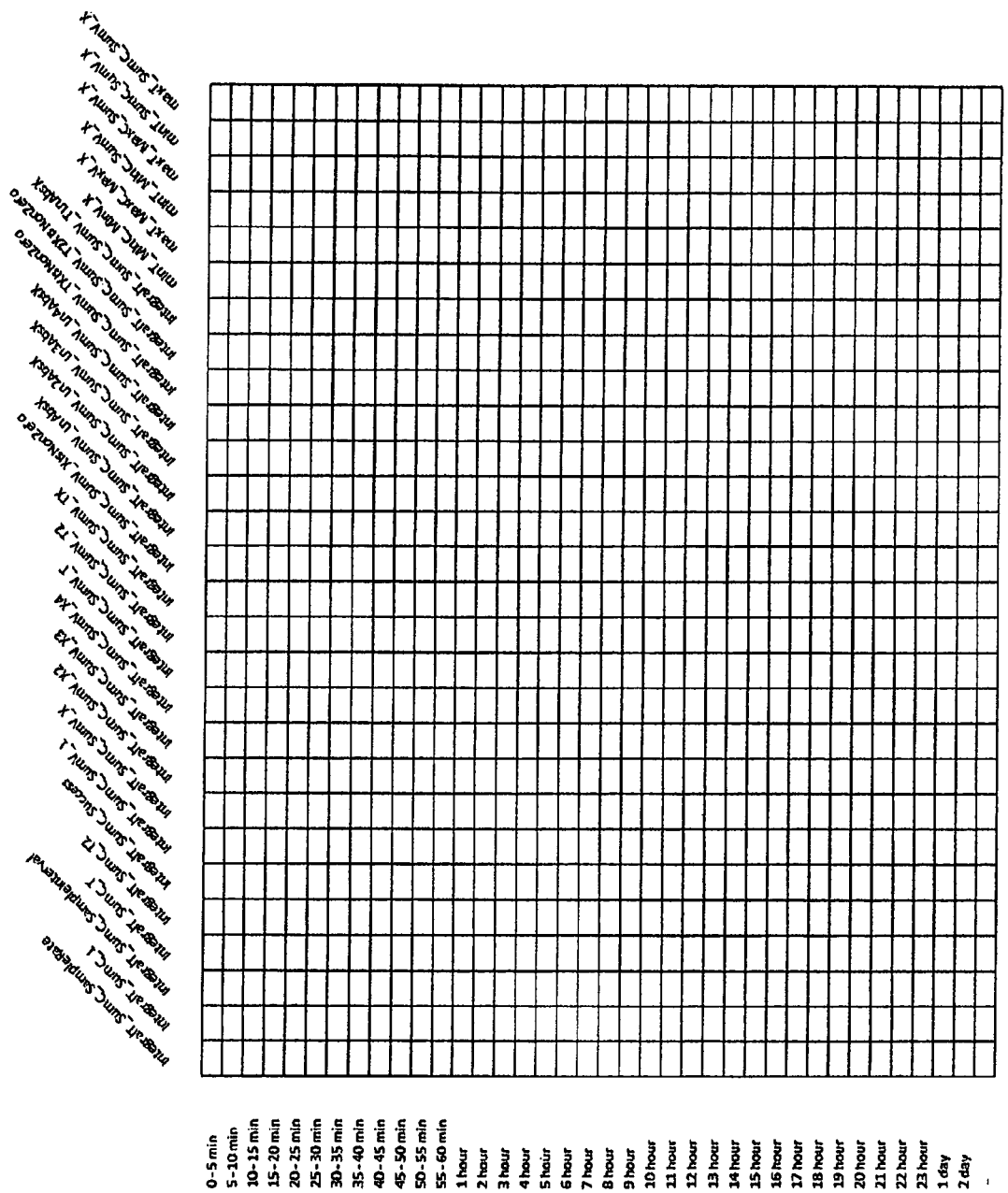
FIG. 3 is a table showing a statistical property bins structure according to the invention.

The bins may collect data over any desired interval. In the example of FIG. 3, a first set of bins collects data over five-minute intervals. In this example, the contents of these five-minute bins are combined every hour into one-hour bins 31a-31n. This frees up the five-minute bins to collect information for the next hour. The one-hour bins may be similarly collapsed, for example, into one-day bins, and so on. Further, the contents of the bins may be preserved locally, may be reported to a remote management console, or may be purged, the system opting for the condensed data contained in a higher level bin. Thus, the system may provide various levels of granularity, for example, the most recent one-hour of data is available in five-minute increments, the most recent one-day of data is available in one-hour increments, and so on. This statistical processing and collapsing of binned data significantly reduces data storage requirements, as well as subsequent processing requirement when mining such data.

An embodiment comprises another mechanism in which bins can be combined to save space, and yet still provide visibility into historical trends over time by collapsing, e.g. five minute bins into hour bins. They can then age even further, e.g. collapsing hour bins into daily bins; and then they can age even further, e.g. collapsing daily to weekly, weekly to monthly, monthly to annual. The system manager still has a view into the past. Some granularity is lost, but these mechanisms consolidate the data and preserve the statistical nature of the data.

Consider a laptop with a battery, where a purchasing manager for the company wants to know if laptops are really being used as laptops or are they just being used on desktops. This allow him to make a purchasing decision, so he would like to collect statistical information for each inspector of each laptop on the times that the laptop is used on the battery and the time that it is used on AC. The purchasing manager does not need to know the instantaneous uses, but the inspector would keep collecting such statistics such that, over time, the purchasing manager could as the result of an inspection query return a value, e.g. saying that 40% of the time the laptop is used on the battery and this justifies the extra expense of a laptop over a desktop computer for that user.

Another example provides application usage tracking, wherein the agent is periodically polling what processes are running, e.g. every 30 seconds. It keeps track of where the application is now running, where it is now not running, e.g. Word is running, or two versions of Word are running, or three instances of Word are running, etc. The agent is monitoring bare information, such as keeping a log indicating that the application started at a particular time, another instance of the application started at another time, and an instance of the application ended at yet another time. When it comes time to report, the client plays back the log and accumulates timelines that indicate that Word was running from one time to another time, and there were two instances that were running at one time. If something changed, e.g. somebody stopped using Word, a new measurement is reported that says a similar instance of Word was running from one time to another. Maybe that instance of Word is shut down and the agent reports now there is no instance of Word running from one point in time to another point in time. This allows one to capture the usage of software in an environment and statistically get a notion of how many instances of Word are being used in an environment during an interval of time because of all of the samples coming in and modifying the bins.

In an embodiment, the inspectors are implemented in a relevance language. One of the determinations involves historical reporting of events that are taking place either at the end points or in the aggregate. The invention effectively collapses the statistics for these end points over time at a central location to get an historical trend of the situation in a managed environment. Such collapsing of information allows one to reduce the amount of information that has to be stored over time.

Figure 2:
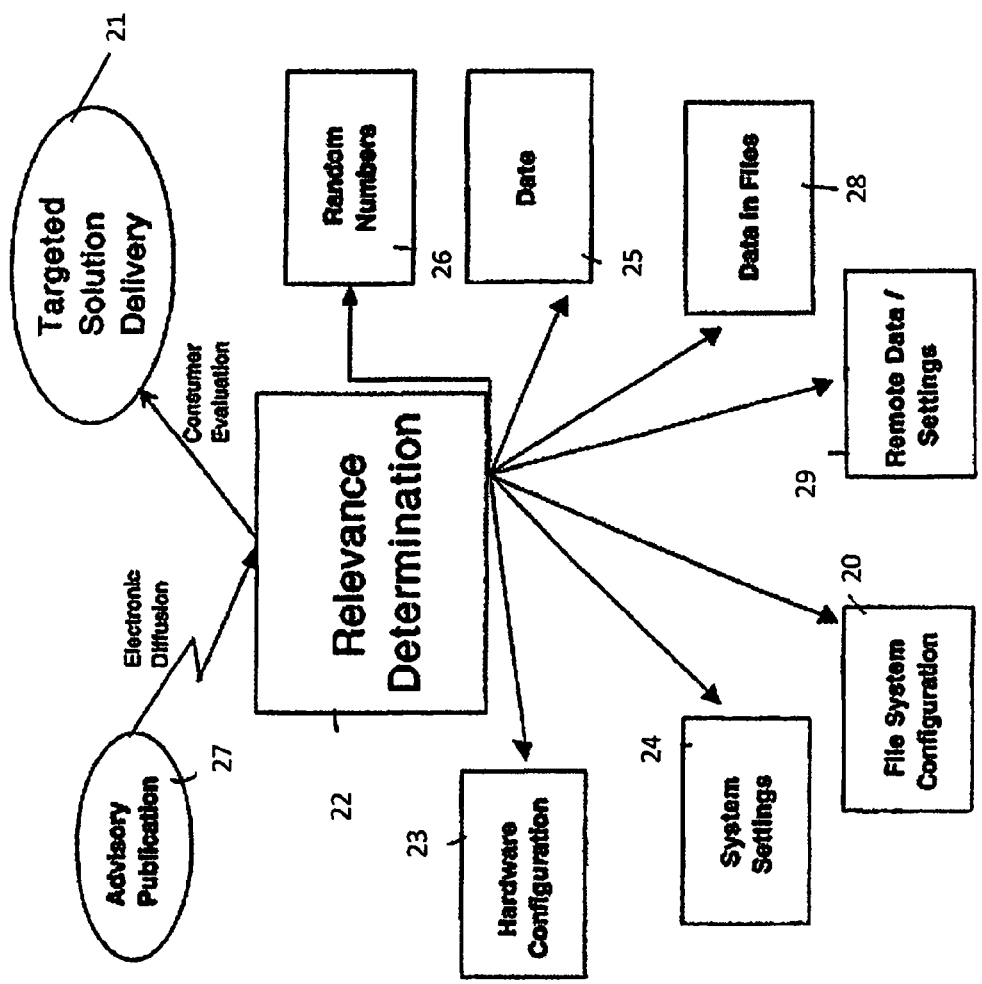
FIG. 2 is a block diagram showing an advisor viewpoint as described in U.S. Pat. No. 7,277,919.

Key to the invention is a management system architecture that comprises a management console function and one or more agents, in communication with the management console function, either directly or indirectly, and which perform a relevance determination function. Relevance determination (see FIG. 2), for example, for targeted solution delivery 21, is carried out by an applications program, referred to as the advice reader 22 which, in the prior art (see U.S. Pat. No. 7,277,919) runs on the consumer computer and may automatically evaluate relevance based on a potentially complex combination of conditions, including:

Hardware attributes. These are, for example, the type of computer on which the evaluation is performed, the type of hardware configuration 23, the capacity and uses of the hardware, the type of peripherals attached, and the attributes of peripherals.

Configuration attributes. These are, for example, values of settings for variables defined in the system configuration 20, the types of software applications installed, the version numbers and other attributes of the software, and other details of the software installation 24.

Database attributes. These are, for example, attributes of files 28 and databases on the computer where evaluation is performed, which may include existence, name, size, date of creation and modification, version, and contents.

Environmental attributes. These are, for example, attributes that can be determined after querying attached peripherals to learn the state of the environment in which the computer is located. Attributes may include results of thermal, acoustic, optical, geographic positioning, and other measuring devices.

Computed attributes. These are, for example, attributes that can be determined after appropriate computations based on knowledge of hardware, configuration, and database and environmental attributes, by applying specific mathematico-logical formulas, or specific computational algorithms.

Remote attributes 29. These are, for example, hardware, configuration, database, environmental, and computed attributes that are available by communicating with other computers having an affinity for the consumer or his computer.

Timeliness 25. These are, for example, attributes based on the current time, or a time that has elapsed since a key event, such as relevance evaluation or advice gathering.

Personal attributes. These are, for example, attributes about the human user(s) of the computer which can either be inferred by analysis of the hardware, the system configuration, the database attributes, the environmental attributes, the remote attributes, or else can be obtained by soliciting the information directly from the user(s) or their agents.

Randomization 26. These are, for example, attributes resulting from the application of random and pseudo-random number generators.

Advice Attributes 27. These are, for example, attributes describing the configuration of the invention and the existence of certain advisories or types of advisories in the pool of advice.

In this way, whatever information is actually on the consumer computer or reachable from the consumer computer may in principle be used to determine relevance. The information accessible in this way can be quite general, ranging from personal data to professional work product to the state of specific hardware devices. As a result, an extremely broad range of assertions can be made the subject of relevance determination. In connection with the invention herein, such information may be stored by the statistical data inspector in one or more bins and subsequently queried and/or processed, as discussed herein.

The invention also has a benefit on the end points as well. One can collapse information to allow the system to represent the important historical trends and then collect the information at that time or in the future. The inspectors can be polling based, using facilities in the environment that allow one to take a snapshot of a certain physical characteristic, such as the amount of space on disk or when the power is on in a device. This embodiment polls and then aggregates data over time to establish operational characteristics of a measurement.

There are other kinds of techniques that you can use in devices, for example where one can be notified of the change. One might measure the value of some property, such as the amount of voltage that is being used by a computer and then be notified when that changes. In the case of mobile machines, for example, they have different power states that they enter into to maximize the battery life. When the device is actually connected to a power cord, it is charging and, in those environments, one may be able to have the device run at full power; and yet when the AC plug is pulled and one wants to preserve battery power, the system reduces the frequency of the processor. The invention allows a system manager to measure those characteristics. The device itself provides event notifications, e.g. the battery is now unplugged or the power supply is now plugged back in. This embodiment of the invention allows one to perform a statistical analysis at the moment of change, as opposed to having to poll it periodically.

One disadvantage of polling is that it is possible to miss rapid changes if the polling connection is lost. Thus, polling has some down sides, but it also has some advantages. There are some things that can not be done except with polling, e.g. where no notification system is built in into the infrastructure that allows software or a device to be notified when a change occurs that a system manager is interested in.

All of the historical information is kept in a database. The invention comprises one or more session inspectors that are allowed to access the aggregate information in the database, as well as instance information, by drilling down into client state and presenting statistical views of state. Thus, an embodiment provides a mechanism for keeping track of historical data trends and provides a statistical aggregation of such trends within, for example, policy guidelines. As a result, one can take corrective action. Notably, this mechanism is not a database query, but is based upon doing an inspection. In fact, some of the measurements can only be stored on the end point and later on, after the fact, although the measurements are being taken and the system manager was not necessarily interested in the information, he can still see an historical trend of, for example, Word execution across an environment. This is because agents have been configured to keep track of this action and then, after the fact, one can aggregate this information and look at the trend information.

If the aggregation is not performed, one has not lost the details. The fact that, for example, a particular machine ran Word at a particular moment in time might mean that one can later on create a filtered query that asks: "How are all of my secretaries using Word?" One can send out an instrumented query that says that set of machines should now report on their statistical view of these particular usages. Then, that data can be aggregated and yet one does not lose the filtering ability in the future for a different query because each agent still has the raw data and it can be aggregated again in the future.

Thus, uniquely, the invention is not merely collecting data and then processing it statistically at some central location. Rather, the invention is collecting information at all sorts of locations and a system manager may be processing it statistically at those locations, but ultimately he may process it from some central location. That is, through the inspection process one is able to slice the data to learn things about it; or to write policies without collecting the data. For example, one could write a policy that says if a person has not used a certain piece of software for a month then it is automatically unavailable to that person. This information does not have to actually flow back to the server, but there is some statistical aggregation that is taking place on the end point to decide if that policy applies to that particular machine. Thus, the invention is not only concerned with learning from the statistics and getting reports, but it is also controlling the system through the statistical information.

One example involves managing a Web server farm. One could decide to take some of servers offline to do optimizations, such as disk defragmentation, clean up of database records, something during a low load interval, then cycle the servers back on, and be able to do some management activities based on operational usage patterns that are statistical in nature and that allow one to make some policy decision. Thus, the infrastructure can make decisions about itself and manage itself locally. For example, if a printer prints more than 8,000 pages a month, which is its designed limit, the system might automatically generate a message to the Purchasing Department to give this group a second printer in order to conform to the design limitation.

In FIG. 1, a plurality of database records are shown, where each bin corresponds to a five minute bin, and where the five minute bin has a start time and an end time. Each one of the fields in the database record corresponds to the number of samples that occurred in that interval, e.g. the sum of the measurements, the sum of the squares of the measurements, the sum of the measurements times the delta and time that they are made. There is also another bin next to this first bin, for example the next five minutes, and then another, etc. Measurements are taken on a desired property of a managed device. These measurements are stored into statistical records that correspond to the time when the measurement is taken, where the measurements themselves have a time and a value, each of which can be aggregated into an appropriate bin. This allows one to identify all kinds of trends. If the trend information in the future is about a five minute interval, then there is also measurement information about all the other five minute intervals.

One aspect of the invention is a collapse of the bins. A five minute collapse can take the database set of records and turn them into a set of one hour bins. This collapses the amount of information and produces information, but it also allows one to store less information and still capture historical trends. Thus, the invention provides a mechanism in a fixed size storage for one to capture information over time for an arbitrary network of computers, such that one can know interesting things about that body of computers without having to have unlimited storage.

The instrumented parameters are aggregated by each individual machine, or one can decide to do aggregation later. One can log the events and then send the events through a system that transposes them into aggregate records. One can combine records from different sources. One can combine records from the same machine in the bins or he can combine records from a subset of machines into bins and define them over time. This representation allows one to combine bins that match in time, e.g. they cover the same time segment. It also allows one to combine them in a fashion that collapses time into a smaller data representation that allows measurements to come in after the collapse has taken place, and that can still impact the statistical property, i.e. the statistical boundaries, in a bin.

Statistical Aggregation

An embodiment of the invention comprises a statistical/historical aggregation facility for a network management system that provides a means of tracking the results of numeric properties over time across many computers. One way of envisioning what exactly the invention does and does not do may be to think about the dimensions of the data managed by a network management system, such as the BES product (BigFix, Inc., Emeryville, Calif.). In such system, property data has two dimensions: a property dimension and a computer dimension. One may envision all the property results as a two dimensional table, with each column representing a single property, and each row representing a single computer. A cell in this table holds the last result reported by a computer for the given property.

The statistical features of such known system provide access to a time dimension: selected properties can be set up to track changes over time. To keep the size of the data manageable, at the same time the time dimension is added the computer dimension is removed. In other words, the database does not store data over time for individual computers. To do so would require a three-dimensional data space and an immense amount of database storage.

Instead, the results from all computers that report on a particular statistical property in a particular time period are aggregated into a single record. Note that the decision to aggregate across the computer dimension concerns one embodiment. If space is not an issue, one could store per computer statistics. Not collapsing the computer dimension would allow one to build statistical bins for arbitrary collections of computers which would be useful in some situations.

One can envision the resulting data set as another two dimensional table. FIG. 3 is a table showing a statistical property bins structure according to the invention. In FIG. 3, each column represents a single property. Each row now represents an interval of time, for example the five minute interval between Jan. 1, 2005 12:00 AM and Jan. 1, 2005 12:05 AM. Each cell in this table holds a plurality of numbers which represent various important statistical properties of the results sent up by all of the client computers who evaluated the property given by the cell's column during the time interval given by the cell's row. These statistics could indicate, for example, that 67 results were recorded during the five-minute period between Jan. 1, 2005 12:00 AM and Jan. 1, 2005 12:05 AM, that the average value recorded in that period was 144.32, and that the maximum value recorded was 226.

These table cells have a special name: statistical bins. For each property, the system keeps a maximum of 2048 bins of 5 minute duration, 2048 bins of 1 hour duration, and 2048 bins of 1 day duration. This is equivalent to about a week's worth of 5 minute bins, three month's worth of hour bins, and 5.5 years of day bins. The bins of a given property never overlap and always form a contiguous range. The inspectors that expose the statistical data work with statistical bins and ranges of statistical bins.

In the example of FIG. 3, over a years worth of detailed statistical information captured for an arbitrary number of machines requires less than 80 kb of storage, determined as follows:

28 entries*64 bits per entry=224 bytes/row
35 rows for most recent day*224 bytes=7840 bytes (or <8 kb)
1 year of daily storage=81,760 bytes (or <80 kb)
The storage required to retain 5.8 years worth of statistical bins (2048 non-overlaping 5 minute, hourly, and daily bins) is:
3*2048 rows=6144 rows
2048*five minutes+2048*hour+2048*day=5.8 years
6144 rows*224 bytes per row=1,374,256 bytes (<1.5 Mb)

Accessing Statistics

The embodiment provides various inspectors for accessing statistical bins.

These are described below:
statistic range of <question>: statistical range
Returns the range of statistical bins associated with the given question. The question must have been marked for statistical aggregation. If it has not, or no clients have reported results, throws NoSuchObject.

Manipulating Statistical Ranges
start of <statistic range>: time
end of <statistic range>: time
Returns the starting and ending times of the range.
range <t: time range>of <statistic range>: statistic range
For t=(t0, t1), returns a sub-range of bins beginning with earliest bin which contains t0 and ending with the bin preceding the latest bin which contains t1. If either of these bins does not exist, throws NoSuchObject.
bin at <t: time>of <r: statistic range>: statistical bin Returns the bin in r which starts before and ends after t. If no such bin exists, throws NoSuchObject.

total of <r: statistic range>: statistical bin

Statistically timewise-totals the bins in r, producing a single bin covering the same range. Primarily useful after constraining the range.

totals <l: time interval>of <r: statistic range>: statistical bin

Used for downsampling bins. Statistically timewise-totals intervals of r, producing a series of bins of length l. The resulting range starts and ends on a multiple of l; for example if one asks for day bins, the result starts and ends at midnight. If l is not a multiple of the length of the starting bin of r, throws NoSuchObject. For example, one cannot get six hour totals of a range which starts with day bins.

bins of <statistic range>: statistical bin

Iterates over the individual bins in the range. Primarily useful after downsampling.

Bin Data start of <statistical bin>: time
    end of <statistical bin>: time
    length of <statistical bin>: time interval
    mean computer count of <statistical bin>: floating point
    mean successful computer count of <statistical bin>: floating point
    mean failing computer count of <statistical bin>: floating point
    mean sample rate of <statistical bin>: rate
    mean sample interval of <statistical bin>: time interval
    sample interval standard deviation of <statistical bin>: time interval
    success rate of <statistical bin>: floating point
    failure rate of <statistical bin>: floating point
    mean value count of <statistical bin>: floating point
    mean zero value count of <statistical bin>: floating point
    mean nonzero value count of <statistical bin>: floating point
    mean of <statistical bin>: floating point
    variance of <statistical bin>: floating point
    standard deviation of <statistical bin>: floating point
    skewness of <statistical bin>: floating point
    kurtosis of <statistical bin>: floating point
    linear fit of <statistical bin>: linear projection
    mean logarithm of <statistical bin>: floating point
    logarithm variance of <statistical bin>: floating point
    logarithm standard deviation of <statistical bin>: floating point
    logarithm skewness of <statistical bin>: floating point
    logarithm kurtosis of <statistical bin>: floating point
    exponential fit of <statistical bin>: exponential projection
    geometric mean of <statistical bin>: floating point
    minimum value of <statistical bin>: floating point
    maximum value of <statistical bin>: floating point
    minimum single computer total of <statistical bin>: floating point
    maximum single computer total of <statistical bin>: floating point
    mean total of <statistical bin>: floating point
    total lower bound of <statistical bin>: floating point
    total upper bound of <statistical bin>: floating point Linear and Exponential Projections A bin represents two-dimensional data: values collected over a range of time. When the time range for a bin is large, one can look for trends in the way the values change over time.

The "linear fit of <statistical bin>" inspector uses the least-squares method to fit a line through the data in the bin. The linear projection it returns has these properties:

correlation coefficient of <linear projection>: floating point

A measure of how well the projection fits the data extrapolation (<time>) of <linear projection>: floating point The projected value at a given time rate of <linear projection>: rate The slope of the line; multiply this by a time interval to compute the projected growth over a period of that length.

The "exponential fit of <statistical bin>" function is similar: it uses the least-squares method to fit a line through the logarithms of the values in the bin. It is therefore only useful for positive data. The exponential projection it returns has these properties:

correlation coefficient of <exponential projection>: floating point

A measure of how well the projection fits the data extrapolation (<time>) of <exponential projection>: floating point The projected value at a given time rate (<time interval>) of <exponential projection>: floating point The factor by which the value is projected to increase over the given time interval.

Using Statistics in Presentations javascript array <s : string>of <statistical bins>: html An aggregate property which produces a hunk of JavaScript which initializes the variable named s as an array of objects, one for each input bin. Each object in the array has JavaScript properties which match the above bin data properties. For each inspector property, the equivalent JavaScript property is named by CamelCasing the name of the inspector property.

Examples mean of total of range ((now-day) & now) of statistics of question 1 of current analysis Returns the mean (average) value across all reported values in the last day. Note that this might fail if there have been no reports in the last day.

javascript array "statistics" of totals (6*hour) of statistics of question 1 of current analysis Produce a JavaScript variable named "statistics" which hold an array of objects representing the statistical data for 6-hour periods across the entire range of data for the question. In actual use, one would want to restrict the range to a known size so that the resulting array was not too big, and to ensure that the range included only hour and 5-minute bins because day bins cannot be down sampled to 6-hour periods.

Stages of Collecting, Recording, and Reporting Statistics

The problem of collecting and reporting historical data can be divided into stages, along the path that the data takes from the collection to display. The first step is data collection. Data collection happens by evaluating a phrase in the inspection language, or by logging a measurement and associating the result with a time. In most cases, the result is associated with the time of evaluation, but there may be situations where a better time could be produced by an expression. For example, an inspector may be able to produce accurate times for system startup or application launches.

There is one more aspect to the data collection that should be noted: some properties change when the computer is shut down, when one can not evaluate them one can predict them.

For example, it is known that while the computer is shut down, no applications are running. On the other hand, it is presumed that the computer has some number of processors even when it is off. One way to handle this is to include, for properties where it is appropriate, an expression that provides the shutdown values. For example, the shutdown expression for "names of running applications" would be "nothing."

The next step on the data path is storing the data on the client. It is necessary to store data on the client: it is necessary to report things that happen while clients are disconnected. This appears to be a significant capability that is lacking in the art.

One approach is logging all the data samples that are collected. This is practical for many, if not all, target cases, and it provides the ability to look back in great detail at the history of a particular client. Another preferred approach involves allowing a level of data aggregation as it gets added to a client's store, so that it is not necessary to be concerned of huge data sets.

The next step is to report the data. It is presently preferred to use arrangements where less data may be regularly reported than are collected. There are two significant ways that historical data impacts the reporting mechanism: it is desired to make sure that reporting identifies differences in historical data well and, when resending reports, it is desired to tag historical data with the report number in which it was first reported, so that the data are not counted twice at the server.

As data travels through e.g. a relay system, it is possible to aggregate it further, achieving some degree of compression and reducing the load on the server. Note that aggregation need not take place at the agent, or the server. In fact, other elements of the infrastructure can be used to perform the aggregations.

When the client reports reach the server, there is another opportunity for aggregation. One possibility involves storing all of the reported data, and may even include setting up a second database server to handle it. In important cases, the full data would be impractical to store.

After the data are in the database, the next step is to deliver it to a report module, such as a BES WebReports server, or the consoles for display. Knowing the nature of the display to be provided, one can collapse the data further at this point, using an aggregation operator stored in the database. Note that an embodiment performs a statistical aggregation across multiple databases into another database. This is implemented in an embodiment on the BES WebReport servers.

There are also either embodiments wherein replication of aggregation bins occur between top level servers. This method does not aggregate bins from other servers, but keeps them separate. The aggregation takes place when creating reports that summarize the statistics across multiple databases. This may be implemented in an embodiment when one deploys more than one top level server.

WebReports has the further need to aggregate data that it receives from multiple servers. To provide a framework for all this aggregation and storage, two concepts are taught: statistical summaries and bins.

A statistical summary is a fixed-size collection of numbers that describes one numeric input was sampled over time. Summaries can be added together to summarize across computers, over time, or both. One point of summaries is that a single summary is a useful unit of data: it tells one where the values are, where they are headed, and how well these things are known. An embodiment provides a single summary format that allows one to calculate the basic statistics that one would want in the majority of situations, such as means, standard deviations, and simple trends. The basic statistics come to about twenty-five floating-point numbers, between ⅛ and ¼ kB. In other embodiments, it is possible to augment this with a small number of advanced summaries, which gather statistics relevant to particular distributions.

A bin is a section of the data stream. Bins may divide the data by source, by time, or by value. In particular, there are bins that represent collections of computers, by group or administrator; regular ranges of time, e.g. hourly, daily, or weekly; or by range of value, e.g. 0-9, 10-19, 20-29; or "starting with B".

An embodiment stores one summary for each bin throughout the system, and lets users adjust the granularity of the bins to suit their needs. For example, the bins for a property on a single client are necessarily for one computer, and one might keep hourly bins for a week, daily bins for a year, and a separate bin for each string value. For reporting, one might combine bins, e.g. according the first two letters of the value. On the server, one might keep daily bins by administrator for six months and weekly bins for the whole installation indefinitely.

Historical Properties

For storage on the client and for transit, one can treat statistical summarization as a compression mechanism. Where a property changes slowly, the system records the values of the property and the times at which changes are noticed. If a property changes rapidly over an interval, the system can record a summary of the changes instead, thereby limiting the data rate.

For client storage, an embodiment keeps the record of each of these properties in a series of files, e.g. starting a new file daily. In this way, it is easy to go back and recompress aging, already-reported data to a longer interval.

An embodiment keeps the data inbins, but performs a form of square-wave Fourier analysis, i.e. there is a fine-grained range of bin sizes, and all but the smallest bins are reserved for properties reported constant on their intervals. In the database there are one minute, five minute, half hour, and hour bins but, when a property is reported as having a constant value from 1:15 to 3:37, only the 1:15-1:30, 1:30-2:00, 2:00-3:00, 3:00-3:30, 3:30-3:35, 3:35-3:36, and 3:36-3:37 bins are modified. The smaller bins are eliminated over time, but they are summed up first, adding the result to the next larger bin. This has implications for the way the maxima and minima are computed over time: If reports come in while the system is keeping fine-grained bins, it can detect non-overlapping intervals and avoid double-counting. When reports come in late, e.g. there is a report of an application that is run from 1:00-2:31, and another for 2:32-3:00, but there are only five-minute bins when the reports come in, then there is double-counting or the overlap is statistically estimated. The presently preferred way to get an exact answer is to keep all the raw intervals, sort them, and scan through the result. This quickly becomes impractical. On the other hand, with this scheme one can go down to five- or even one-second intervals if desired. Six hours of one-second intervals is manageable in five megabytes.

The following is a list of the functional pieces into which the historical analysis feature can be broken:

Summaries:
    A statistical summary definition
    Algorithms for adding summaries over time and over computers
    C++ implementations of same
    Flatteners (presumably to a textual format) for storage and reporting
    Flatteners for constant-value intervals Historical Recording:
  Historical property recorder, producing raw interval data
  Compressor for raw interval data
  Advanced: recompressor
Analysis Format:
  Extensions for specifying historical properties and retention/reporting policies
  Interfaces for specifying such properties (BDE, Custom Analyses, Import/Wizards)
Client:
  Read extensions to analysis format
  Feed historical questions into recorder
  Report compressed historical data
  Advanced: inspectors for the historical store
Database:
  Stored aggregators for adding summaries over time and computers
  Tables for storing historical summaries
    File historical data into database
Console:
    Collect and display historical data.

When one measures computer properties statistically, one is summing up over three dimensions. At various times (T), computers (C) evaluate an expression. The evaluation may result in an error, or it may succeed. If the expression succeeds, it produces a collection of values (V). Successful singular expressions produce exactly one value; plural expressions may produce any number of values. Because the system divides samples up into time bins, and because the sampling is somewhat irregular, a transformation is performed before summing up. The discretely sampled values are extended to piecewise linear functions. If one finds the values x0 at t0, x1 at t1, and x2 at t2, then construct the piecewise linear function $$X(t) = x0 \quad \text{from } t0 \quad \text{to } (t0+t1)/2$$
$$x1 \quad \text{from}(t0+t1)/2 \quad \text{to } (t1+t2)/2$$
$$x2 \quad \text{from } (t1+t2)/2 \quad \text{to } t2$$

If a plural expression produced multiple values at time t1, the multivalued function X would have all those values in the range (t0+t1)/2 to (t1+t2)/2.

There are several other functions that are used to keep tabs on the process:

$$\text{Success} = 1 \quad \text{on intervals where evaluation is successful}$$
$$0 \quad \text{on intervals where there is an error}$$

If the expression is successful, but returns not-a-number results, the NaNs are not counted as values. Infinities are counted. The statistics involving X are only computed over successful intervals. In particular, if there are only errors in a bin, the maxima are set to −infinity and the minima to +infinity.

The sample rate function helps one know how detailed the measurements are. Unlike the piecewise linear functions above, it changes at the time of the sample, not at the midpoint between samples.

$$\text{SampleRate} = 1/(t1-t0) \quad \text{from } t0 \text{ to } t1$$
$$1/(t2-t1) \quad \text{from } t1 \text{ to } t2$$
$$\text{SampleInterval} = t1-t0 \quad \text{from } t0 \text{ to } t1$$
$$t2-t1 \quad \text{from } t1 \text{ to } t2$$

The maximum and minimum statistics are only computed for non-error intervals; if there are only errors, the maximum is set to −infinity and the minimum to +infinity. The naming of the values also indicates the way one sums up the fields:

| | |
|---|---|
| integralT | the time integral over the duration of the bin |
| maxT | the maximum over times in the bin |
| minT | the minimum over times in the bin |
| sumC | the sum over computers reporting at a particular time |
| maxC | the maximum over computers reporting at a particular time |
| minC | the minimum over computers reporting at a particular time |
| sumV | the sum over concurrent values on single computer |
| maxV | the maximum over concurrent values on single computer |
| minV | the minimum over concurrent values on single computer |
| 2, 3, 4 | raised to the power 2, 3, or 4 |
| LnAbs | the logarithm of the absolute value |
| Ln2Abs | the square of the logarithm of the absolute value |

While many of the names are integralT_sumC, it is not practical to sum over the computers before doing the time integral. The sum over computers must happen centrally, and late reports would keep the old sums fluctuating. This would end up repeating the time integration as changes came in. Instead, an embodiment slices the time axis into bins, and computes the sum over time bins of the sum over computers of the integral over time within a bin. This produces the same answer because the inner integral commutes with the sum over computers.

The same rearrangement happens with minT_minC and maxT_maxC. The rearrangement does not work with minT_sumC or maxT_sumC, however. These statistics are important for tracking software usage, e.g. many licenses are calibrated by maximum concurrent usage. The same rearrangement is performed, computing maxB_sumC_maxT in place of maxT_sumC. That is necessarily an upper bound on maxT_ sumC; it treats each computer as if it had held its maximum value for the entire length of the bin. Likewise, the substitution of minB_sumC_minT for minT_sumC gives a lower bound, treating each computer's minimum as holding for the whole length of the bin.

The accuracy of the approximation depends on the size of the bin and the amount of variation in the reported values. If the bins are small enough that few computers report value changes in each bin, the approximation is good.

Therefore, one may decide to keep finer-grained bins for these two numbers. In any case, the results are valid as bounds on the values.

This is the list of values presently tracked:

IntegralT_SumC_SampleRate
  The integral of the sample rate is a smoothed-out measure of the number of samples; dividing by duration gives the mean sample rate.

IntegralT_SumC__1
  This is summing up the number of computers that are reporting. Divide it by duration to get the mean number of computers.

IntegralT_SumC_SampleInterval
> The integral of the sample interval is a smoothed-out measure of the square of the number of samples, useful in telling how evenly spaced the samples were.

IntegralT_SumC_Success
> This is summing up the number of computers that are reporting without error. Divide it by the length of time to get the mean number of computers reporting successful evaluation.

IntegralT_SumC_SumV_1
> This is summing up the number of values reported, weighted by duration. It is used in the denominator of many statistics.

IntegralT_SumC_SumV_XIsNonZero
> This is measuring the number of nonzero values reported, and it appears in the denominator of statistics on the logarithms.

IntegralT_SumC_SumV_X
> This is the basic summing-up over time: divide by IntegralT_SumC_SumV_1 to get the mean value, weighted by duration.

IntegralT_SumC_SumV_LnAbsX
> Some values are best measured by their logarithms. Because it is hard to guess which ones, the system keeps statistics on both the raw values and the natural logarithms of their absolute values. Zero values are not counted in the logarithmic statistics.

IntegralT_SumC_SumV_X2
IntegralT_SumC_SumV_Ln2AbsX
> The sum of the squares is used to compute the variance and standard deviation, which describe the spread of the values.

IntegralT_SumC_SumV_X3
IntegralT_SumC_SumV_Ln3AbsX
> The sum of the cubes is used to compute the skewness, which indicates whether the outliers are primarily above or below the mean.

IntegralT_SumC_SumV_X4
IntegralT_SumC_SumV_Ln4AbsX
> The sum of the fourth powers is used to compute the kuratosis, which describes the prevalence of outliers.

IntegralT_SumC_SumV_TX
IntegralT_SumC_SumV_TLnAbsX
> Multiplying the values by the time of measurement, piecewise constant in the integral, gives a description of whether the values are rising or falling.

IntegralT_SumC_SumV_TX2
IntegralT_SumC_SumV_TLn2AbsX
> Multiplying the squares by the time of measurement gives a description of whether the spread is increasing or decreasing.

MinT_MinC_MinV_X
MaxT_MaxC_MaxV_X
> These are the bounds on the outlying values.

MinT_MinC_SumV_X
MaxT_MaxC_SumV_X
> These are the bounds on the outlying computers.

MinT_SumC_SumV_X
MaxT_SumC_SumV_X
> These are the bounds on the concurrent totals, approximated as described above.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A computer for managing a plurality of computer network elements, comprising:
a storage memory;
said computer configured for a management console function; and
said computer configured for at least one statistical inspector, in communication with said management console function said at least one statistical inspector remotely performing a relevance determination function in connection with an associated network element for collecting, storing in said storage, and manipulating time-based data at said associated network element;
said management console function comprising a bin mechanism for collapsing said time-based data stored by said at least one statistical inspector for said network element to identify an historical trend in connection with said network element and/or said plurality of network elements;
wherein said at least one statistical inspector comprises:
a binning structure for storing said time-based data as time based measurements;
wherein each of said time based measurements is stored within a bin that represents a discrete interval of time;
wherein said binning structure comprises:
a first series of time stamped bins that collect time-based data for a first discrete interval of time; and
at least one additional series of time stamped bins that collect time-based data for at least one additional, different discrete interval of time;
wherein said time-based data are stored in one or more statistical bins and wherein said management console function combines minute bins every hour into hour bins and hour bins into day bins and wherein the contents of the bins are any of: stored locally, reported to a remote management console, and purged, for reducing data storage requirements while consolidating data and preserving the statistical nature of said data; and
said statistical inspector using a least-squares method to fit a line through data in a particular bin or a line through the logarithms of the data in the bin to provide a statistical projection that is used in identifying said historical trend.

2. The apparatus of claim 1, wherein said at least one statistical inspector provides a statistical representation of said data that collapses the amount of said data relative to any of time and content.

3. The apparatus of claim 1, wherein said at least one statistical inspector combines said data in response to said management console function.

4. The apparatus of claim 1, wherein said at least one statistical inspector measures at least one parameter related to said associated network element.

5. The apparatus of claim 1, wherein said at least one statistical inspector receives at least one query from said management console function in connection with any of collection, storage, and manipulation of time-based data at said associated network element by said at least one statistical inspector.

6. The apparatus of claim 1, wherein said at least one statistical inspector develops statistics based upon said time-based data, and combines said statistics to identify trends over time.

7. The apparatus of claim 1, wherein each bin comprises:
a plurality of fields that are populated with said time-based data and results of statistical operations that are performed by said statistical inspector upon said time-based data.

8. The apparatus of claim 7, wherein contents of each of said bins are any of preserved locally, reported to said remote management console, and purged after being stored as condensed data contained in a higher level bin.

9. The apparatus of claim 7, wherein contents of each of said bins are combined.

10. The apparatus of claim 1, said at least one statistical inspector comprising a mechanism for receiving a polling query from said management console function with regard to said time-based data, and for aggregating said time-based data over time to establish operational characteristics of a measurement.

11. The apparatus of claim 1, said at least one statistical inspector implemented in a relevance language for executing at least one relevance determination with regard to said time-based data.

12. The apparatus of claim 11, said at least one statistical inspector automatically determining relevance in connection with said associated network element based on any of:
hardware attributes;
configuration attributes;
database attributes;
environmental attributes;
computed attributes;
remote attributes;
timeliness;
personal attributes;
randomization; and
advice attributes.

13. The apparatus of claim 1, said at least one statistical inspector evaluating management and/or remediation information from said management console function by automatically performing any of:
mathematico-logical calculations;
executing computational algorithms;
returning results of system calls;
accessing contents of said associated network element;
querying said associated network element to evaluate any of:
said properties of said associated network element;
said associated network element configuration;
contents of storage devices associated with said associated network element;
peripherals associated with said associated network element; and
said associated network element environment.

14. The apparatus of claim 1, said at least one statistical inspector automatically determining relevance in connection with said associated network element and providing at least one notification based upon a relevance determination result.

15. The apparatus of claim 1, further comprising:
a database for storing historical information;
at least one session inspector for accessing aggregate historical information stored in said database and for presenting statistical views of the state of one or more network elements based upon said historical information.

16. The apparatus of claim 15, said at least one session inspector accessing said aggregate historical information stored in said database relative to a policy and taking corrective action if said policy so indicates.

17. The apparatus of claim 1, said management console function comprising a mechanism for issuing a query to said at least one session inspector in connection with said time-based data, wherein any of:
said time-based data are aggregated by said at least one session inspector for said associated network element;
said time-based data are aggregated by said management console function;
said at least one session inspector logs events and said events are transposed into aggregate records;
records from a plurality of sources are combined;
records from a same network element are combined in associated bins;
records from a plurality of network elements are combined into associated bins;
bins are combined over a same time segment;
bins are combined to collapse time into a smaller data representation; and
measurements relative to a network element after bins are combined to collapse time into a smaller data representation impact statistical boundaries in said bins.

18. The apparatus of claim 1, wherein said at least one statistical inspector aggregates said time based data at any one or more elements in a hierarchy of distributed network elements.

19. The apparatus of claim 18, said hierarchy comprising an aggregational pipeline in which aggregation can occur at any of one or more points along the entire pipeline from agent samples values and sampling time, relays collecting and forwarding, servers collecting and forwarding, consoles collecting and displaying, and cross server consolidation,
wherein said statistical inspector stores and forwards raw data or aggregates raw data and stores said aggregated raw data and/or forwards said aggregated raw data.

20. The apparatus of claim 1, said at least one statistical inspector comprising:
an aggregation algorithm that combines measurements into bins, combines bins with like bins, and consolidates bins into a smaller number of bins.

21. A computer implemented method for managing a plurality of computer network elements, comprising the steps of:
providing, by a processor, a management console function;
providing at least one statistical inspector, in communication with said management console function for remotely performing a relevance determination function in connection with an associated network element for collection, storage, and manipulation of time-based data at said associated network element; and
providing an aggregational pipeline in which aggregation can occur at any of one or more points along the entire pipeline from agent samples values and sampling time, relays collecting and forwarding, servers collecting and forwarding, consoles collecting and displaying, and cross server consolidation;
wherein said statistical inspector stores and forwards raw data or aggregates raw data and stores said aggregated raw data and/or forwards said aggregated raw data;
wherein said statistical inspector comprises:
a binning structure for storing said time-based data as time based measurements;
wherein each of said time based measurements is stored within a bin that represents a discrete interval of time;
wherein said binning structure comprises:
a first series of time stamped bins that collect time-based data for a first discrete interval of time; and at least one additional series of time stamped bins that collect time-based data for at least one additional, different discrete interval of time;

wherein said management console function comprises a bin mechanism for collapsing said time-based data stored by said statistical inspector for at least one network element to identify an historical trend in connection with said network element and/or a plurality of network elements;

wherein said time-based data are stored in one or more statistical bins and wherein said management console function combines minute bins every hour into hour bins and hour bins into day bins and wherein the contents of the bins are any of: stored locally, reported to a remote management console, and purged, for reducing data storage requirements while consolidating data and preserving the statistical nature of said data; and wherein said statistical inspector uses a least-squares method to fit a line through data in a particular bin or a line through the logarithms of the data in the bin to provide a statistical projection that is used in identifying said historical trend.

* * * * *